United States Patent

Bernardi et al.

3,705,140
Dec. 5, 1972

[54] PEPTIDES RELATED TO THE C-TERMINAL SEQUENCE OF CCK-PZ AND CAERULEIN

[72] Inventors: Luigi Bernardi, No. 1 Via Gignous, Milan; Germano Bosisio, No. 37 Via Monte Sabotino, Palazzolo; Roberto DeCastiglione, No. 38 Via Domenichino; Onofrio Goffredo, No. 6 Via Cremosano, both of Milan, all of Italy

[22] Filed: July 12, 1968

[21] Appl. No.: 744,315

Related U.S. Application Data

[63] Continuation-in-part of Ser. No. 721,613, April 16, 1968, abandoned.

[30] Foreign Application Priority Data

Oct. 5, 1967 Italy.....................21259 A/67
June 7, 1968 Italy.....................17444 A/68

[52] U.S. Cl............260/112.5, 260/457, 260/471 A, 260/482 B, 260/482 C, 260/559 H, 260/938, 424/49, 424/177
[51] Int. Cl........................A01k 27/00, C07c 103/52
[58] Field of Search.................................260/112.5

[56] References Cited

UNITED STATES PATENTS

| | | | |
|---|---|---|---|
| 3,472,832 | 10/1969 | Bernardi et al. | 260/112.5 |
| 3,488,726 | 1/1970 | Ondetti et al. | 260/112.5 |
| 3,579,494 | 5/1971 | Ondetti et al. | 260/112.5 |

FOREIGN PATENTS OR APPLICATIONS

| | | | |
|---|---|---|---|
| 67-10472 | 2/1968 | Netherlands | 260/112.5 |

OTHER PUBLICATIONS

Anastasr et al., Experientia 23, 699– 700 (1967).
Bernardi et al. I, Experientia 23, 700– 702 (1967).
Bernardi et al. II, Experientia 25, 7–8 (1969).
Erspumer et al., Experientia 24, 702–703 (1967).
Morley, Peptides, John Wiley and Sons, New York (1967). pp. 226– 234. QD 431 E8 1966
Morley et al., Nature 207, 1356– 1359 (1965).
Mutt et al., Biochem. Biophys. Res. Commun. 26, 392– 397 (1967).
Tracy et al., Nature 204, 935– 938 (1964).
Vagne et al., Am. J. Physiol. 215, 881– 884 (1968).

*Primary Examiner*—Lewis Gotts
*Assistant Examiner*—Melvyn Mark Kassenoff
*Attorney*—Curt M. Avery, Arthur E. Wilfond, Herbert L. Lerner and Daniel J. Tick

[57] ABSTRACT

The present invention relates to new biologically active polypeptides and to the process for their preparation. More particularly the present invention relates to the polypeptides of the formula:

$$X - Gly - Trp - Y - Asp - Phe - NH_2$$

wherein X is selected from the group consisting of

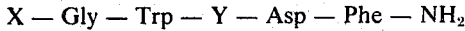
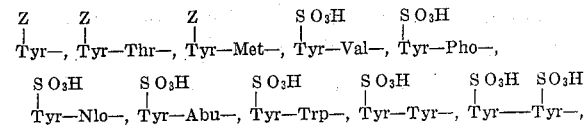

and

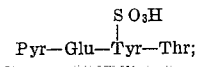

Y is selected from the group consisting of Met-, Nle- and Abu;
Z is selected from the group consisting of $-SO_3H$ and $-PO_3H_2$, and its protected derivatives.

The invention further describes a process for the preparation of polypeptides having the above formula.

The polypeptides of the present invention display a high polyvalent biological action. In particular they display a stimulating activity on gallbladder, on biliary, gastric and pancreatic secretion and also a hypotensive activity and may be employed especially in the stimulation of the gastric and pancreatic secretion, in the cholecystography and in duodenal ulcers.

15 Claims, No Drawings

PEPTIDES RELATED TO THE C-TERMINAL SEQUENCE OF CCK-PZ AND CAERULEIN

This application is a continuation-in-part of our copending application Ser. No. 721,613, now abandoned filed Apr. 16, 1968 and relates to new biologically active polypeptides and to the process for their preparation.

More particularly the present invention relates to the polypeptides of the formula:

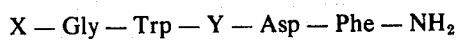

wherein X is selected from the group consisting of

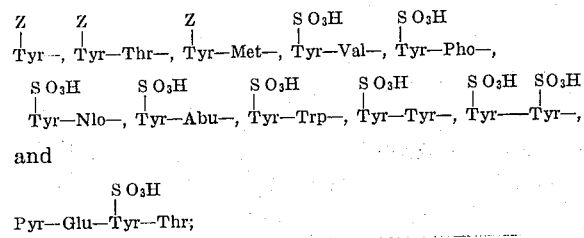

and $$\underset{Pyr-Glu-Tyr-Thr;}{\overset{SO_3H}{|}}$$

Y is selected from the group consisting of Met-, Nle- and Abu;

Z is selected from the group consisting of $-SO_3H$ and $-PO_3H_2$ and its protected derivatives.

According to the purpose of the invention, the radical X could represent also other di- or polypeptide groups without altering the biological activity of the compounds.

In fact, it has been found that the condition necessary for a high biological activity is the presence of tyrosine sulfate in the 7 position from the C-terminal amino acid of the molecule, while this activity does not depend on the sequence of initial aminoacids of the molecule.

A further object of the present invention are also the protected derivatives of the said polypeptides and the process for their preparation.

The products of the present invention display a stimulating activity on gall-bladder, on biliary, gastric and pancreatic secretion and also a hypotensive activity.

The polypeptides of the present invention may be prepared according to the synthesis known in the polypeptide chemistry, mainly consisting in the successive condensation of aminoacids or protected polypeptides so that the resulting polypeptide has the desired sequence of aminoacids.

The aminoacids and the polypeptides, which from time to time are condensed, have their amino and carboxyl groups not involved in the formation of the peptidic linkage, duly blocked by a protecting group capable of being removed by acidolysis or hydrogenolysis or other known methods.

The following protecting groups may be employed for the protection of the amino group, for example: tosyl (P-toluensulfonyl), carbobenzoxy (carbobenzyloxy), carbo-t-butoxy, p-nitrocarbobenzoxy, trityl (triphenylmethyl), formyl, trifluoro-acetyl and others usually employed in the polypeptide chemistry.

The following protecting groups may be employed for the protection of the carboxyl group, for example: methyl, ethyl, t-butyl, benzyl, p-nitrophenyl and others usually employed in this field.

The condensation between the amino group of one molecule and the carboxyl group of another molecule to form the peptide linkage takes place according to the usual methods known in the polypeptide chemistry, for example through a suitable activated acyl-derivative such as mixed anhydride, azide, p--nitrophenyl ester and 2,4,5-trichlorophenyl ester or by direct condensation, between the free amino group and the free carboxyl group, in the presence of a suitable condensing agent such as a carbodiimide selected from the group consisting of dicyclohexylcarbodiimide, 1-cyclohexyl-3-morpholinyl-carbo-diimide and others known in literature.

The condensation may be carried out in a suitable solvent of the group of N,N-dialkylformamides, lower aliphatic nitriles and pyridines, for example dimethylformamide, acetonitrile and pyridine; the reaction starts at from $-20°$ C to room temperature and it is completed at a temperature of from room temperature to $35°$ C for a period of from 12 hours to 10 days.

The sulfuric and phosphoric group present in the polypeptides of the present invention may be introduced, in known manner, at the end of the condensation.

Alternatively the condensation may be performed by employing a suitable derivative of tyrosine which already contains it.

The introduction of said groups is preferably carried out at low temperature with a sulfating agent such as chlorosulfonic acid or sulfuric anhydride in pyridine or pyridine-phosphoric oxychloride.

The products of the invention display a high polyvalent biological action and, particularly, they display a stimulating action on the gallbladder, on the biliary, gastric and pancreatic secretion and further display a hypotensive activity.

They may be employed especially in the stimulation of the gastric and pancreatic secretion, in the cholecystography and in duodenal ulcers.

The activities of the products of the invention were assayed in parallel on the following test objects and compared with the activity of cholecystokinin-pancreozymin, a polypeptide known in the literature (Mutt V., Jorpes E., Recent Progr. Horm. Res. 23, 1967, page 483): dog blood pressure (hypotension), denervated gastric pouch of the dog (stimulation of acid secretion), perfused rat stomach preparation (stimulation of acid secretion), dog pancreas (stimulation of secretion), guinea-pig gallbladder (contraction).

The activity of a given weight of cholecystokininpancreozymin has been considered as equal to 1 and the activity of the same weight of the other polypeptides has been expressed as a percentage.

The results obtained are listed in Table 1.

TABLE 1

| Compounds | Dog blood pressure | Denervated gastric pouch(dog) | Perfused rat stomach | dog pancreas | guinea-pig gallbladder |
| --- | --- | --- | --- | --- | --- |
| Tyr(SO$_3$H)—Thr—Gly—Trp—Met—Asp—Phe—NH$_2$ | 10 | 6 | 3 | 11 | 8 |
| Tyr(PO$_3$H)—Thr—Gly—Trp—Met—Asp—Phe—NH$_2$ | 1 | 1,5 | — | 1,5 | 1 |
| Tyr(SO$_3$H)—Met—Gly—Trp—Met—Asp—Phe—NH$_2$ | 30 | 2 | 10 | 10 | 17 |
| Boc—Tyr(SO$_3$H)—Thr—Gly—Trp—Met—Asp—Phe—NH$_2$ | 10 | 8 | 5 | 6 | 8 |
| Boc—Tyr(SO$_3$H)—Met—Gly—Trp—Met—Asp—Phe—NH$_2$ | 20 | 10 | 8 | 10 | 9 |
| Tyr(SO$_3$H)—Thr—Gly—Trp—Nle—Asp—Phe—NH$_2$ | 30 | 25 | 13 | 18 | 15 |
| Pyr—Glu—Tyr(SO$_3$H)—Thr—Gly—Trp—Met—Asp—Phe—NH$_2$ | 32 | 30 | 15 | 22 | 14 |
| cholecystokinin-pancreozymin | 1 | 1 | 1 | 1 | 1 |

The following Examples are to illustrate the invention without limiting it.

EXAMPLE 1

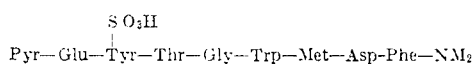

Pyr—Glu—Tyr(SO$_3$H)—Thr—Gly—Trp—Met—Asp—Phe—NH$_2$

To a solution, cooled to −15° C of 11.90 g of Boc-Thr in 120 cc of anhydrous tetrahydrofuran are added 6.12 cc of N-methylmorpholine, followed by 5.19 cc of ethylchloroformate, drop by drop so that the temperature is maintained at −10° C.

It is shaken again for 8 minutes at −10° C, then a solution of 9,02 g of Z-NH-NH$_2$ in 30 cc of anhydrous tetrahydrofuran is added. (Z means carbobenyoxy group).

The temperature is maintained at −10° C for 1 hour, then at 0° C for 4 hours and at last at 22° C, overnight.

The reaction mixture is filtered, the solvent is evaporated under reduced pressure, the residue is dissolved in ethyl acetate and the organic solution at 0° C is washed with 1N hydrochloric acid, then with a saturated solution of sodium chloride, a solution of 5 percent sodium bicarbonate and finally with water to neutrality.

After dryness over anhydrous sodium sulfate the solvent is evaporated under reduced pressure and 19.80 g of crude Boc-Thr-NH-NH-Z are obtained.

280 cc of acetyl chloride are dropped under shaking in a solution of 51.6 g of Boc-Thr-NH-NH-Z, cooled to 0° C, in 28 cc of glacial acetic acid and 28 cc of 6N HCl.

It is further shaken for 1 hour at 0° C, then diluted slowly, under strong shaking, with 2800 cc of ether. The precipitate is filtered and decolored with carboraffin in methanolic solution. The solution is then concentrated under reduced pressure till precipitation of a crystalline product. It is then diluted with isopropyl alcohol and it is allowed to stand overnight in a refrigerating room at 0° C.

The product obtained is filtered and washed with isopropyl alcohol and then with ether.

32.77 g of

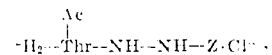

·H$_2$—Thr(Ac)—NH—NH—Z·Cl⁻ · melting at 125°-126° C. are obtained; [α]$^{22}_D$ = + 10° (c=1 in dimethylformamide); D$_{1,2}$=0.94 Glu; 0.85 Leu.

To a solution of 16.88 g of Boc-Tyr in 200 cc of anhydrous tetrahydrofuran, cooled to − 15° C, are added, drop by drop, 6.71 cc of N-methylmorpholine, followed by 7.84 cc of isobutyl chloroformate so that the temperature is maintained at −10° C. It is shaken again for 8 minutes at −10° C; after which a suspension obtained by dissolving 20.75 g of

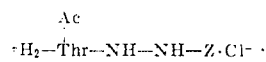

·H$_2$—Thr(Ac)—NH—NH—Z·Cl⁻ · in 10 cc of dimethylformamide and 100 cc of tetrahydrofuran is then added dropwise, cooling and adding 6.71 cc of N-methylmorpholine dropwise.

30 cc of tetrahydrofuran are employed for washing.

The reaction mixture is shaken for 2 hours at −10° C, for 4 hours at 0° C and then overnight at room temperature. It is filtered, the tetrahydrofuran is substituted by ethyl acetate and the solution is washed at 0° C with 1N HCl and then with a solution of 5 percent NaHCO$_3$. After drying over sodium sulfate and evaporation of the solvent under reduced pressure, the residue is crystallized, in the warm, from ether-ethyl acetate.

21.12 g of

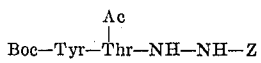

melting at 133°–134° C are obtained; $[\alpha]^{21}_D = -1.6°$ (c=1 in dimethylformamide). A solution of 5.80 g of

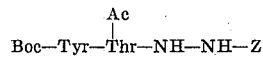

in 55 cc of 1.33N solution of anhydrous HCl in glacial acetic acid is maintained at 22° C for 30 minutes. The solvent is then evaporated under reduced pressure and the residue pulped with anhydrous ether.

5,6 g of

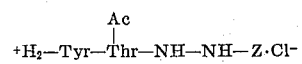

melting at 150°–160° C are obtained; $[\alpha]^{21}_D = +29°$ (c=1 in 95 percent acetic acid); $E_{1,2}$=0.68 Glu; 0,62 Leu.

To a solution of 3.17 g of

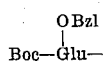

in 30 cc of anhydrous tetrahydrofuran, cooled to –15° C, are added 1.05 cc of N-methylmorpholine, followed by 0.90 cc of ethyl chloroformate drop by drop so that the temperature is maintained at –10° C.

The mixture is further shaken for 10 minutes at –10° C, then a precooled solution of 4.78 g of

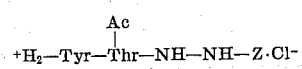

in 3 cc of dimethylformamide and 30 cc of tetrahydrofuran containing 1.05 cc of N-methylmorpholine is added dropwise.

It is shaken for 2 hours at –10° C, for 4 hours at 0° C and overnight at room temperature. It is filtered, the tetrahydrofuran is substituted with ethyl acetate and the usual washings are carried out first with 1N HCl at 0° C, then with a solution of 5 percent sodium bicarbonate.

It is dried over Na$_2$SO$_4$, the solvent is evaporated under reduced pressure and the residue is crystallized from ether-acetone.

6.29 g of

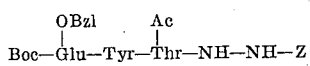

melting at 180°–182° C, are obtained.

On recrystallization from methanol, the analytic sample melting at 183°–184° C is obtained; $[\alpha]^{21}_D = -3.6°$ (c=1 in dimethylformamide).

A solution of 1.83 g of

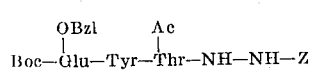

in 30 cc of 1.33 N solution of anhydrous HCl in glacial acetic acid is allowed to stand at 22° C for 30 minutes. The solvent is then evaporated under reduced pressure and the residue is pulped with anhydrous ether and recrystallized from anhydrous isopropyl alcohol-ether.

1.45 g of

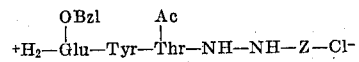

melting at 182° C (decomposition) are obtained. $[\alpha]^{21}_D = +28°$ (c=1 in 95 percent acetic acid); =+5.5° (c=1 in dimethylformamide). $E_{1,2}$=0.56 Glu; 0.51 Leu.

To a solution of 0.513 g of Z-Pyr in 12 cc of anhydrous tetrahydrofuran, cooled to –15° C, are added 0.218 cc of N-methylmorpholine, followed by 0.255 cc of isobutyl chloroformate. It is shaken for 10 minutes at –10° C, then a precooled solution of 1.42 g of

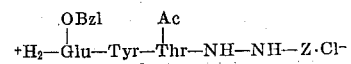

is dropped in a mixture of 8 cc of tetradydrofuran and 2 cc of dimethylformamide, added with 0.218 cc of N-methylmorpholine.

It is shaken for 1 hour at –10° C, for 3 hours at 0° C, then overnight at room temperature. It is filtered, the solvent is evaporated under reduced pressure and the residue is taken up with a little ethyl acetate. The produce is crystallized, filtered and washed with a diluted solution of citric acid and then with water till neutrality.

On recrystallization from methanol-ethyl acetate-ether 1.28 g of

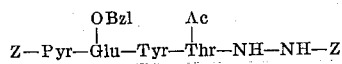

melting at 222°–224° C are obtained. $[\alpha]^{22}_D = -9.2°$ (c=1 in dimethylformamide).

A solution of 1.41 g of

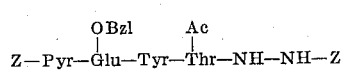

in 60 cc of dimethylformamide is hydrogenated under atmospheric pressure and at room temperature in the presence of 1.20 g of 10 percent palladium over charcoal.

After 40 minutes 0.60 g of catalyst suspended in 10 cc of dimethylformamide are added.

Hydrogenation is carried on for further 60 minutes, then the catalyst is filtered off and the solvent evaporated to small volume in vacuo.

By dilution with ethanol-ether are obtained 0.84 g of

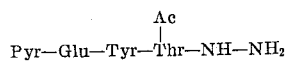

melting at 193°–194° C.

$[\alpha]^{22}_D = +2.8°$ (c=0.6 in dimethylformamide); $E_{1,2}$= 0.48 Glu; 0.43 Leu.

0.84 g of

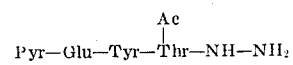

are dissolved in 4 cc of dimethylformamide, cooled to −25° C and added with 1.60 cc of 2.05N solution of anhydrous HCl in anhydrous tetrahydrofuran, followed by 0.185 cc of t-butyl nitrite. It is shaken for 15 minutes at −25° C, then 0.733 cc of triethylamine are added, followed by a solution of 0.69 g of

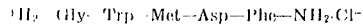

in 6 cc of dimethylformamide, precooled to −25° C.

It is shaken for 30 minutes at −25° C, then it is allowed to stand for 4 days in a refrigerating room at −12° C. It is filtered, concentrated to small volume in vacuo, acidified with a concentrated solution of citric acid and diluted with water.

The precipitate is filtered, washed with water till neutrality, then with a mixture of methanol-ether and finally with ether. By recrystallization from dimethylformamide-ethanol 1.00 g of

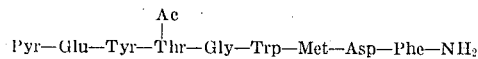

melting at 208°–210° C (decomposition) are obtained; $[\alpha]^{22}_D = -15°$ (c=1 in dimethylformamide). $E_{5.8} = 0.28$ Glu.

0.8 cc of chlorosulfonic acid are added to 3.5 cc of anhydrous pyridine, cooled to −10° C and the suspension is maintained under stirring at −10° C for 10 minutes. Then a solution of 0.204 g of

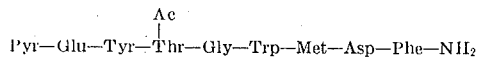

in 2.2 cc of dimethylformamide is added under stirring at room temperature for 5 hours. The solvent is evaporated off in vacuo and the oily residue is dissolved in 5 cc of water and 3 cc of 2M solution of KHCO₃, then the solution is cooled to 0° C and acidified to Congo red indicator with 1N HCl.

The separated product is dissolved by addition of triethylamine. The resulting solution is evaporated to dryness in vacuo and the solid residue is taken up in dimethylformamide and filtered from the insoluble inorganic salts. The solvent is then evaporated in vacuo and the residue is purified by pulping in chloroform and final washing with anhydrous ether.

The product thus obtained is then suspended in 20 cc of the lower phase of the ethanol-butanol-water system (1:5:8) and neutralized to phenolphthalein with 2N NaOH The resulting solution is saponified with two equivalents of 2N NaOH for 3 hours at room temperature.

The solution is cooled, acidified to Congo red indicator with 1N HCl and the separated product is dissolved by addition of triethylamine.

The solvent is evaporated in vacuo and the residue is taken up with chloroform and then with ether, then it is purified by elution. 0.10 g of

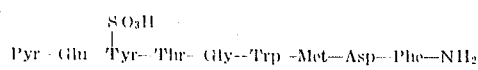

are obtained; $E_{1.9} = 0.57$ CySO₃H (cysteic acid); $E_{5.8} = 0.50$ Glu; 0.39 CySO₃H.

EXAMPLE 2

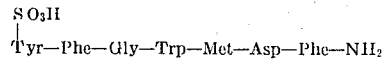

First 10.4 g of n.tributylamine and then 6.075 g of ethyl chloroformate are added to a solution of 14.800 g of Boc-Phe in 120 cc of anhydrous tetrahydrofuran, cooled to −10° C.

The reaction mixture is stirred for 30 minutes and then poured into a solution of 7.82 g of ethyl glycinate hydrochloride and 5.670 g of triethylamine in 80 cc of anhydrous chloroform, precooled to −10° C.

It is maintained at this temperature for 2 hours, 2 hours at about 0° C and finally at room temperature overnight.

After removing the solvent in vacuo, the residue dissolved in ethyl acetate and a little water and cooled with a refrigerating mixture is washed with 0.5N HCl, with 5 percent NaHCO₃ and finally with water.

After dryness the solvent is evaporated under vacuum.

The residue is dissolved in 100 cc of ethanol and 40 cc of water; 55 cc of N NaOH are added and the whole is allowed to stand for 1 hour.

Most of the ethanol is evaporated in vacuo and, after dilution with 200 cc of H₂O, the impurities are extracted from the reaction mixture employing ethyl acetate.

After cooling the alkaline solution, it is acidified with 5N HCl and Boc-Phe-Gly is extracted with ethyl acetate; the extracts combined are dried and the solvent is evaporated in vacuo.

The residue is crystallized from ether and 13.680 g of Boc-Phe-Gly melting at 163°–164° C (decomposition) are obtained; $[\alpha]^{20}_D = -11°$ (c=0.6 dimethylformamide).

3.255 g of dicyclohexylcarbodiimide are added to a solution of 4.830 g of Boc-Phe-Gly and 1.815 g of N-hydroxysuccinimide in 7 cc of anhydrous dimethylformamide, cooled at −10° C.

After stirring it for 30 minutes at −10° C, 2 hours at 0° C, 1 hour at room temperature, the excess of dicyclohexylcarbodiimide is removed with some drops of acetic acid.

The dicyclohexylurea is filtered off; the dimethylformamide is removed in vacuo and the residue, dissolved in very little ethyl acetate does not dissolve the last traces of dicyclohexylurea which separate.

Finally the solvent is evaporated in vacuo.

The oily residue, dissolved in the least quantity of dimethylformamide, is poured into a solution, cooled to 0° C, of 5.970 g of Trp-Met-Asp-Phe-NH₂ and 1.015 g of N-methylmorpholine in 60 cc of dimethylformamide.

The mixture is allowed to stand at 0° C for 30 minutes and then at room temperature for 2 days.

After decomposing the excess of activated ester with 0.5 cc of diethylamine-ethylamine, the solvent is evaporated in vacuo and a solution of 3.00 g of citric acid in 10 cc of water and then 200 cc of water are poured into the oily residue.

A flaky mass is obtained, which is washed till neutrality with water.

After dryness the solid is washed with ether in the warm (three times), with ethyl acetate (three times) and finally again with ether.

The residue is crystallized from methanol-ether.

6.790 g of Boc-Phe-Gly-Trp-Met-Asp-Phe-NH$_2$ melting at 185°–187° C (decomposition) are obtained; $[\alpha]^{20}_D = -32.5°$ (c=0.6 dimethylformamide).

3.600 g of Boc-Phe-Gly-Trp-Met-Asp-Phe-NH$_2$ are dissolved in 100 cc of 99 percent formic acid and the solution is maintained at room temperature for 3 hours.

After evaporating the solvent in vacuo the residue is crystallized from methanol/ether.

3.120 g of Phe-Gly-Trp-Met-Asp-Phe-NH$_2$ melting at 191°–193° C (decomposition) are obtained; $E_{1.2} = 0.47$ Leu.

A solution of 0.845 g of Boc-Tyr and 0.363 g of N-hydroxysuccinimide in 9 cc of dimethylformamide is cooled with a refrigerating mixture and 0.650 g of dicyclohexylcarbodiimide are added.

After shaking for 30 minutes at −10° C, for two hours at 0° C, for 1 hour at room temperature, the excess of dicyclohexylcarbodiimide is destroyed with few drops of acetic acid.

The dicyclohexylurea is removed by filtration; the dimethylformamide is removed in vacuo and the residue, dissolved in very little ethyl acetate, does not dissolve the last traces of dicyclohexylurea which separate.

At the end the solvent is evaporated in vacuo.

The oily residue, dissolved in the smallest quantity of dimethylformamide, is poured into a solution, cooled to 0° C of 1.640 g of Phe-Gly-Trp-Met-Asp-Phe-NH$_2$ and 0.2023 g of methylmorpholine in 15 cc of dimethylformamide.

The reaction mixture is maintained at 0° C for 30 minutes and then at room temperature for 2 days.

After decomposition of the excess of activated ester with 0.1 cc of diethylamino-ethylamine, the dimethylformamide is evaporated in vacuo and a solution of 1.500 g of citric acid in 5 cc of water and 200 cc of water are poured into the oily residue. A flaky mass is obtained, which is washed till neutrality with water.

After dryness, the solid is washed, in the warm, with ether (three times), ethyl acetate (three times) and finally with ether. 1.450 g of Boc-Tyr-Phe-Gly-Trp-Met-Asp-Phe-NH$_2$ melting at 186°–188° C (decomposition) are obtained; $[\alpha]^{20}_D = -29.5$ (c=0.6 dimethylformamide).

0.14 cc of chlorosulfonic acid are slowly added and under strong stirring to 10.0 cc of anhydrous pyridine, cooled to −10° C.

The suspension is allowed to stand under stirring for 15 minutes, then a solution of 0.325 g of Boc-Tyr-Phe-Gly-Trp-Met-Asp-Phe-NH$_2$ in 3.5 cc of dimethylformamide is added.

The refrigerating bath is removed and it is allowed to stand under stirring at room temperature for 5 hours.

The resulting yellow solution is then evaporated to dryness in vacuo and the semisolid residue is taken up with 5 cc of 2M of KHCO$_3$.

When the formation of carbon dioxide is over, the mixture is diluted with 10 cc of water, the solution is cooled to 0° C and acidified with 6N HCl until acid with Congo red indicator.

The pH is adjusted to 7.5–8 by addition of triethylamine and the resulting solution is evaporated to dryness in vacuo (40°).

The residue is taken up with a little dimethylformamide, pulped and the insoluble inorganic salts are filtered through a porous septum, washing then well with dimethylformamide.

The yellowish filtrate is evaporated to dryness in vacuo and the residue is taken up with chloroform, well pulped, filtered on a porous septum, washed with chloroform and at the end with anhydrous ether.

After drying in vacuo at room temperature 0.33 g of

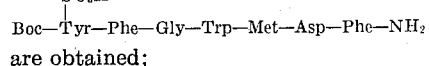

are obtained;

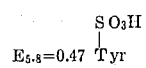

By acid hydrolysis the corresponding

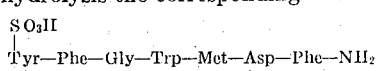

is obtained

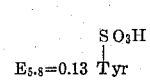

EXAMPLE 3

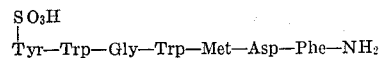

According to Example 2 is prepared the protected dipeptide Boc-Trp-Gly, melting at 108°–110° C (decomposition), $[\alpha]^{20}_D = -18°$ (c=0.6 dimethylformamide), which, by condensation with Trp-Met-Asp-Phe-NH$_2$ gives the corresponding Boc-Trp-Gly-Trp-Met-Asp-Phe- NH$_2$, melting at 177°–179° C (decomposition), $[\alpha]^{20}_D = -31.8°$ (c=0.6 dimethylformamide).

By removing the protecting group, the corresponding Trp-Gly-Trp-Met-Asp-Phe-NH$_2$, melting at 184°–185° C (decomposition) is obtained; $E_{1.2} = 0.44$ Leu.

This compound is condensed with Boc-Tyr and the corresponding Boc-Tyr-Trp-Gly-Met-Asp-Phe-NH$_2$ melting at 168°–170° C (decomposition) is obtained; $[\alpha]^{20}_D = -28.9°$ (c=0.6 dimethylformamide), from which, by treatment with chlorosulfonic acid in pyridine

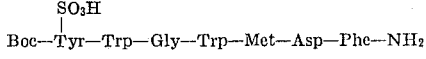

is obtained; $E_{5.8} = 0.41$

which, by acid hydrolysis gives the corresponding

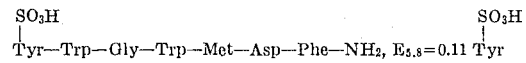

EXAMPLE 4

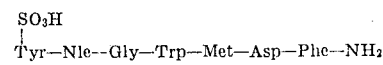

Operating according to Example 2, Boc-Nle-Gly is condensed with Trp-Met-Asp-Phe-NH$_2$ to obtain Boc-Nle-Gly-Trp-Met-Asp-Phe-NH$_2$ melting at 179°–180°C (decomposition), $[\alpha]^{20}_D = -31.1°$ (c=0.6 dimethylformamide), which gives the corresponding Nle-Gly-Trp-Met-Asp-Phe-NH$_2$ melting at 184°–187°C (decomposition), $E_{1.2} = 0.43$ Leu.

This compound is condensed with Boc-Tyr to obtain Boc-Tyr-Nle-Gly-Trp-Met-Asp-Phe-NH$_2$ melting at 165°–168° C (decomposition), $[\alpha]^{20}_D = -26°$ (c=0.6 dimethylformamide); from which by treatment with chlorosulfonic acid in pyridine is obtained

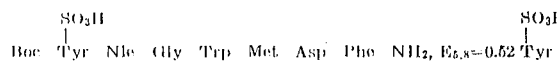

By acid hydrolysis the corresponding

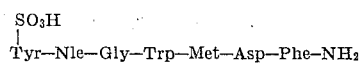

is obtained, $E_{5.8} = 0.16$

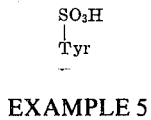

EXAMPLE 5

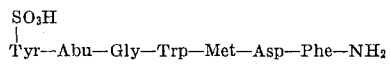

Operating as in Example 2, Boc-Abu-Gly is condensed with Trp-Met-Asp-Phe-NH$_2$ and from Boc-Abu-Gly-Trp-Met-Asp-Phe-NH$_2$, thus obtained, melting at 195°–197° C (decomposition), $[\alpha]^{20}_D = -30°$ (c=0.6 dimethylformamide), the corresponding Abu-Gly-Trp-Met-Asp-Phe-NH$_2$, melting at 200°–202° C (decomposition) is obtained; $E_{1.2} = 0.42$ Leu.

This compound is condensed with Boc-Tyr and the resulting Boc-Tyr-Abu-Gly-Trp-Met-Asp-Phe-NH$_2$, melting at 182°–184° C, $[\alpha]^{20}_D = -26.2°$ (c=0.6 dimethylformamide), is then treated with chlorosulfonic acid to give the corresponding

which by acid hydrolysis gives the corresponding

EXAMPLE 6

Carrying out the condensation as in Example 2, for Boc-Val-Gly, whose dicyclohexylammonium salt melts at 165°–166° C, and Trp-Met-Asp-Phe-NH$_2$ is obtained Boc-Val-Gly-Trp-Met-Asp-Phe-NH$_2$, melting at 201°–202° C (decomposition), $[\alpha]^{20}_D = -23.5°$ (c=0.6 dimethylformamide).

From this product the corresponding Val-Gly-Trp-Met-Asp-Phe-NH$_2$, melting at 193°–194° C (decomposition) is obtained, $[\alpha]^{20}_D = -11.2°$ (c=0.6 dimethylformamide). $E_{1.2} = 0.50$ Leu, which by condensation with Boc-Tyr and successive treatment with chlorosulfonic acid in pyridine gives the corresponding

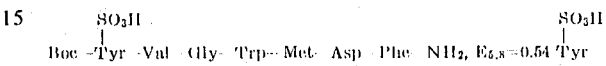

By acid hydrolysis the corresponding

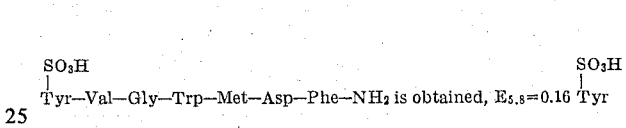

EXAMPLE 7

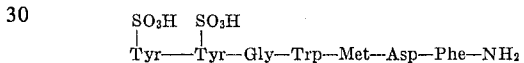

Carrying out the condensation as in Example 2, from Boc-Tyr-Gly, melting at 170°–172° C (decomposition), $[\alpha]^{20}_D = -8.5°$ (c=0.6 dimethylformamide) and Trp-Met-Asp-Phe-NH$_2$ is obtained Boc-Tyr-Gly-Trp-Met-Asp-Phe-NH$_2$, melting at 183°–184° C (decomposition), $[\alpha]^{20}_D = -32.2°$ (c=0.6 dimethylformamide).

By acid hydrolysis the corresponding Tyr-Gly-Trp-Met-Asp-Phe-NH$_2$, melting at 205°–207° C (decomposition) is obtained; $E_{1.2} = 0.43$ Leu, from which by condensation with Boc-Tyr- the corresponding Boc-Tyr-Tyr-Gly-Trp-Met-Asp-Phe-NH$_2$ melting at 158°–160° C (decomposition) is obtained, $[\alpha]^{20}_D = -27°$ (c=0.6 dimethylformamide).

By treatment with chlorosulfonic acid in pyridine the corresponding

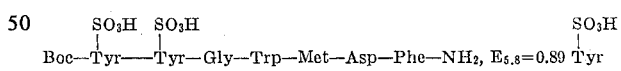

which by acid hydrolysis gives the corresponding

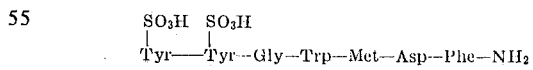

was obtained.

EXAMPLE 8

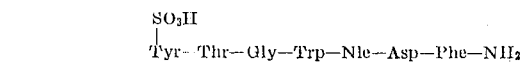

A solution of 4.17 g of Boc-Trp-Nle-Asp-Phe-NH$_2$ in 150 cc of 99 percent formic acid is allowed to stand for 3 hours at room temperature. The solvent is then evaporated at 30° C under reduced pressure and the residue is taken up with anhydrous ether and then recrystallized from methanol.

3.58 g of Trp-Nle-Asp-Phe-NH$_2$ melting at 238° C (decomposition) are obtained; $E_{1.2}$ = 0.62 Glu, 0.57 Leu.

The analytic sample, recrystallized from dimethylformamide, melts at 220° C (decomposition).

From 4.33 g of Boc-Thr, operating as in the above examples by crystallization from ether-petroleum ether 4.02 g of Boc-Thr-Gly-OC$_2$H$_5$, melting at 87°–88° C are obtained, $[\alpha]^{23°}_D = -17.4°$ (c=1 methanol).

By hydrazinolysis of 3.74 g of Boc-Thr-Gly-OC$_2$H$_5$ in 35 cc of ethanol and 15 cc of 85 percent hydrazine hydrate for 20 hours at room temperature, on recrystallization from ethanol-ether, 3.47 g of Boc-Thr-Gly-NH-NH$_2$ melting at 129°–130° C are obtained; $[\alpha]^{23°}_D = -7.6°$ (c=1 dimethylformamide).

0.58 g of Boc-Thr-Gly-NH-NH$_2$ are dissolved in 4 cc of dimethylformamide, cooled to −25° C and added with 2.5 cc of 2.1N solution of anhydrous HCl in anhydrous tetrahydrofuran, followed by 0.24 cc of t-butyl nitrite.

The mixture is shaken for 10 minutes at −25° C, then 1.02 cc of triethylamine are added, followed by a suspension of 0.58 g of Trp-Nle-Asp-Phe-NH$_2$ in 10 cc of dimethylsulfoxide containing 0.14 cc of triethylamine.

5 cc of dimethylformamide are added, then the reaction mixture is allowed to stand for 3 days at −12° C.

After recrystallization from methanol-ethyl acetate, 0.60 g of Boc-Thr-Gly-Trp-Nle-Asp-Phe-NH$_2$, melting at 194°–195° C (decomposition) are obtained; $[\alpha]^{25}_D = -27.3°$ (c=1 dimethylformamide).

0.80 g of Boc-Thr-Gly-Trp-Nle-Asp-Phe-NH$_2$ are reacted for 3 hours with 30 cc of 99 percent formic acid.

By recrystallization from dimethylformamide-ethyl acetate 0.66 g of Thr-Gly-Trp-Nle-Asp-Phe-NH$_2$ melting at 198° C (decomposition) are obtained; $[\alpha]^{25}_D = -12.5°$ (c=1 99 percent formic acid), $E_{1.2}$ = 0.56 Glu; 0.51 Leu.

By condensation of this product with p-nitrophenyl ester of

the corresponding

Boc—Tyr—Thr—Gly—Trp—Nle—Asp—Phe—HN is obtained

EXAMPLE 9

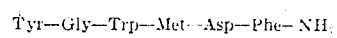

Tyr—Gly—Trp—Met—Asp—Phe—NH$_2$

The p-nitrophenyl ester of p-nitrocarbobenzoxy tyrosine-sulfate is prepared in the following manner:

6.3 g of 4N potassium hydroxide are added to 6.7 g of tyrosine sulfate (J. Biol. Chem. 217. 703 (1955) ); the reaction mixture is cooled to −5° C and added with 5.4 g of p-nitrocarbobenzoxy chloride dissolved in 12 cc of dioxane and 6.3 cc of 4N potassium hydroxide.

The mixture is filtered and the filtrate is acidified with N hydrogen chloride until turning acid with Congo red indicator. It is filtered and dried.

The dried solid is dissolved in 50 cc of dimethylformamide; 2.6 g of p-nitrophenol and 3.2 g of dicyclohexylcarbodiimide are added. After a night the reaction is filtered and evaporated to dryness in vacuo. The oily residue is repeatedly pulped with ethyl acetate and then with petroleum ether. The pulverulent residue is used as such in the successive reactions.

To 0.45 g of Gly-Trp-Met-Asp-Phe-NH$_2$ (J.C. Anderson et al. Tetrahedron, Suppl. 8, p. 39, 1966), dissolved in 5 cc of dimethylformamide, 0.6 g of the crude product above described and 0.2 cc of triethylamine are added. After 8 days the mixture is evaporated and the residue is crystallized from ethanolethyl ether.

The solid is dissolved in 300 cc of methanol, 2 g of 10 percent palladium on charcoal are added in three times and it is hydrogenated until formation of carbon dioxide is noted.

The solvent is evaporated and the residue is purified by countercurrent distribution in the system butanol:ethanol:acetic acid: water (4:8:8:3) to give 0.12 g of the product desired;

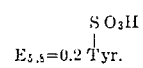

EXAMPLE 10

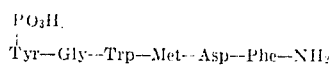

The p-nitrophenyl ester of the carbo-t.butoxy-tyrosine-phosphate is prepared in the following manner:

0.89 g of p-nitrophenol and 1.1 g of dicyclohexylcarbodiimide are added to 1.5 g of carbo-t.butoxytyrosine in 30 cc of ethyl acetate. After a night the mixture is filtered, evaporated and crystallized from ethyl ether-petroleum ether obtaining 2 g of carbo-t.butoxy-tyrosine-p-nitrophenylester, melting at 123°–125° C, which are dissolved in 6 cc of pyridine and added at −15° C with 0.77 g of POCl$_3$ dissolved in 6 cc of pyridine.

After 2 hours at room temperature it is poured into ice, acidified with diluted sulfuric acid, extracted with chloroform, the extracts evaporated to dryness and the residue is pulped with ether It is used as such for the successive reactions.

0.28 cc of N-methylmorpholine and 0.5 g of the crude product above described are added to a solution of 0.4 g of Gly-Trp-Met-Asp-Phe-NH$_2$ in 10 cc of dimethylformamide.

After 8 days at room temperature it is diluted with water and filtered.

The protected polypeptide

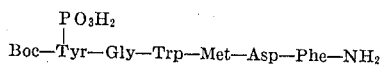

is obtained;

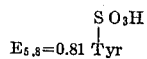

This product is dissolved in acetic acid and added with 1.3 N hydrogen chloride in acetic acid. After 1 hour the mixture is evaporated to dryness and the residue purified by countercurrent distribution in the system butanol:ethanol:acetic acid:water (4:8:8:3) 0.11 g of the desired product are obtained;

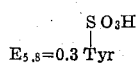

EXAMPLE 11

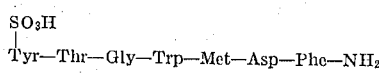

To 0.7 g of carbo-t-butoxy- -Thr-NHNH$_2$ (Ann. Chem. 656, p. 190, 1962) dissolved in 9 cc of dimethylformamide are added 3 cc of 2N hydrogen chloride in tetrahydrofuran and 0.36 cc of n-butyl nitrite.

After 6 minutes at −20° C, are added 1.4 g of Gly-Trp-Met-Asp-Phe-NH$_2$, dissolved in 15 cc of dimethylformamide and 1.4 cc of triethylamine.

The mixture is allowed to stand at 0° C for 4 days, diluted with water and the precipitate is crystallized from ethyl acetate-methanol. 1.1 g of Boc-Gly-Trp-Met-Asp-Phe-NH$_2$, melting at 168°–170° C are obtained which are treated with hydrogen chloride in acetic acid for 30 minutes to give Thr-Gly-Trp-Met-Asp-Phe-NH$_2$ hydrochloride, melting at 170° C; $E_{1.2}$ = 0.52 Glu.

To 0.54 g of Thr-Gly-Trp-Met-Asp-Phe-NH$_2$, dissolved in 5 cc of dimethylformamide are added 0.66 g of p-nitrophenyl ester of p-nitrocarbobenzoxy-tyrosine sulfate, prepare as described in Example 9. After 7 days the mixture is evaporated to dryness and the residue is pulped in little ethanol and filtered. The residue (0.54 g) is dissolved in 200 cc of methanol and 5 cc of dimethylformamide; 1.5 g of 10 percent palladium on charcoal and two equivalents of cyclohexylamine are added in three times and the mixture is hydrogenated until carbon dioxide is eliminated.

The mixture is evaporated to dryness and the residue is purified by countercurrent distribution in the system butanol-ethanol acetic acid-water (4:8:8:3) 0.05 g of the desired product are obtained;

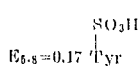

EXAMPLE 12

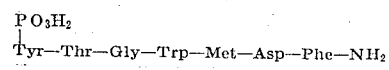

To 0.4 g of Thr-Gly-Trp-Met-Asp-Phe-NH$_2$ dissolved in 10 cc of dimethylformamide are added 0.28 cc of N-methyl-morpholine and 0.48 g of p-nitrophenyl ester of the carbo-t.butoxy-tyrosine phosphate, described in Example 10.

After 7 days the reaction mixture is evaporated to dryness to give

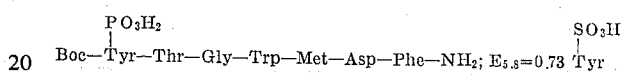

This product is treated for 40 minutes with 1.3 N hydrogen chloride in acetic acid.

It is evaporated under vacuum and purified by countercurrent distribution in the system butanol-ethanol-acetic acid-water (4:8:8:3).

0.03 g of the desired product are obtained;

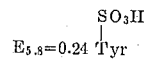

EXAMPLE 13

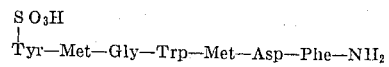

To 1.6 g of Gly-Trp-Met-Asp-Phe-NH$_2$ dissolved in 15 cc of dimethylformamide are added 1 g of carbo-t-butoxy-methionine p-nitrophenyl-ester (Gazz. Chim. Ital. 95, p. 185, 1965) and 0.3 cc of triethylamine. After 4 days at room temperature it is diluted with 0.1 N hydrogen chloride and the precipitate is purified by crystallization from ethanol-water.

The obtained solid which weighs 1.2 g, melting at 198° C (with decomposition), is treated with 1.3 N hydrogen chloride in acetic acid for 30 minutes to give Met-Gly-Trp-Met-Asp-Phe-NH$_2$ hydrochloride melting at 195° C; $E_{1.2}$ = 0.49 Glu.

To 0.8 g of Met-Gly-Trp-Met-Asp-Phe-NH$_2$ dissolved in 10 cc of dimethylformamide, are added 1.2 g of p-nitrophenylester of p-nitrocarbobenzoxy-tyrosine sulfate.

After 7 days the reaction mixture is evaporated to dryness and the residue is pulped in little ethanol and filtered.

The residue is dissolved in methanol and dimethylformamide, then hydrogenated in the presence of 10 percent palladium on charcoal and optionally of cyclohexylamine (Acta Chim. Acad. Sci. Ung. 50, p. 339, 1966) until development of carbon dioxide is noted. The mixture is evaporated to dryness and the residue is purified by countercurrent distribution in the system butanol-ethanol-acetic acid-water (4:8:8:3) 0.10 g of the desired product are obtained,

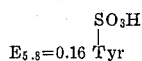
$E_{5.8}=0.16$ Tyr

EXAMPLE 14

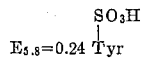
$\overset{PO_3H_2}{\underset{|}{Tyr}}$—Met—Gly—Trp—Met—Asp—Phe—NH$_2$ The polypeptide Met-Gly-Trp-Met-Asp-Phe-NH$_2$ is condensed with the p-nitrophenylester of carbo-t-butoxy-tyrosine phosphate, described in Example 10. The condensation is carried out as in the previous example and the desired product is obtained;

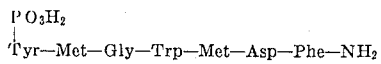
$E_{5.8}=0.24$ Tyr

EXAMPLE 15

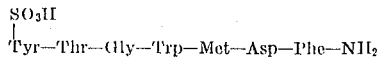
Tyr—Thr—Gly—Trp—Met—Asp—Phe—NH$_2$

To 10 g of trifluoroacetyl-tyrosine (Chem. Ber. 89, 1956, page 647) in 100 cc of tetrahydrofuran are added 4.2 cc of N-methylmorpholine and 3.6 cc of ethyl chloroformate, at the temperature of −10° C. After 10 minutes there are added 4.9 g of carbo-tert.butoxy hydrazine dissolved in 20 cc of anhydrous tetrahydrofuran.

The mixture is allowed to stand over night and then the solvent is evaporated; the residue is dissolved in ethyl acetate, washed with N hydrogen chloride. The mixture is evaporated to dryness and the residue is crystallized from ethyl ether-petroleum ether.

16 g of Tfa-Tyr-NHNH-Boc, melting at 80° C, are obtained and then dissolved into acetic acid and added with 100 cc of 1.3 N hydrogen chloride in acetic acid. After a few minutes, Tfa-Tyr-NHNH$_2$ . HCl, melting at 186° C, is obtained; $E_{1.2}=0.69$ Glu.

To 0.66 g of this product dissolved in 5 cc of dimethylformamide and cooled to −25° C are added 3cc of 2N hydrogen chloride in tetrahydrofuran and 0.24 cc of n-butylnitrite.

After 10 minutes there are added 1.37 cc of triethylamine and 0.85 g of

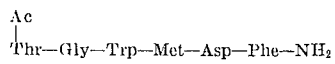
$\overset{Ac}{\underset{|}{Thr}}$—Gly—Trp—Met—Asp—Phe—NH$_2$ in 5 cc of dimethylformamide (disclosed in the Belgian Pat. No. 702,405 of the Applicants).

The mixture is allowed to stand 4 days at −12° C, it is filtered, evaporated to dryness and on crystallization from dimethylformamide-isopropanol 0.75 g of Tfa-Tyr-Thr-Gly-Trp-Met-Asp-Phe-NH$_2$ are obtained and added at −10° C to a suspension obtained by adding 3.2 cc of chlorosulfonic acid to 40 cc of pyridine.

After a night the mixture is evaporated to dryness, the residue is taken up with water, acidified until turning acid with Congo red indicator and extracted with the upper layer of the system butanol-ethanol-water (5:1:8). The extract is evaporated to dryness to yield

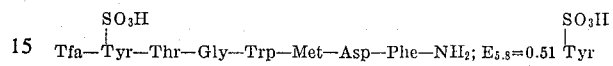
Tfa—Tyr—Thr—Gly—Trp—Met—Asp—Phe—NH$_2$; $E_{5.8}=0.51$ Tyr

The product is dissolved in 30 cc of dimethylformamide and added with 100 cc of concentrated ammonium hydroxide.

After 2 hours, the reaction mixture is evaporated to dryness and the residue is purified by countercurrent distribution with the solvent system above cited. 0.11 g of the desired product are obtained.

EXAMPLE 16

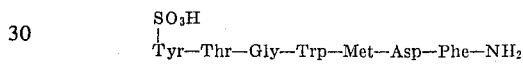
Tyr—Thr—Gly—Trp—Met—Asp—Phe—NH$_2$

Operation is carried out as described in Example 11 but carrying out the condensation between Thr-Gly-Trp-Met-Asp-Phe-NH$_2$ and carbo-t-butoxy-tyrosine-sulfate and obtaining the protected polypeptide

Boc—Tyr—Thr—Gly—Trp—Met—Asp—Phe—NH$_2$, $E_{5.8}=0.54$ Tyr

EXAMPLE 17

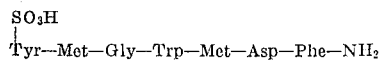
Tyr—Met—Gly—Trp—Met—Asp—Phe—NH$_2$

Operation is carried out as described in Example 13 but carrying out the condensation between Met-Gly-Trp-Met-Asp-Phe-NH$_2$ and carbo-t. butoxy-tyrosine sulfate and obtaining the protected polypeptide

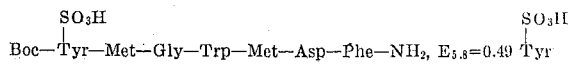
Boc—Tyr—Met—Gly—Trp—Met—Asp—Phe—NH$_2$, $E_{5.8}=0.49$ Tyr

We claim:
1. A peptide of the formula: X-glycyl-L-tryptophyl-Y-L-aspartyl-L-phenylalaninamide, wherein X is selected from the group consisting of O-Z-L-tyrosyl, O-Z-L-tyrosyl-O-Z-L-threonyl, O-Z-L-tyrosyl-L-Methionyl, O-sulfate-L-tyrosyl-L-valyl, O-sulfate-L-tyrosyl-L- phenylalanyl, O-sulfate-L-tyrosyl-L-norleucyl, O-sulfate-L-mtyrosyl-L-α-aminobutyryl, O-sulfate-L-tyrosyl-L-tryptophyl, O-sulfate-L-tyrosyl-L-tyrosyl and O-sulfate-L-tyrosyl-O-sulfate-L-tyrosyl, Y is selected from the group consisting of L-methionyl, L-norleucyl and L-α-aminobutyryl, and Z is selected from the group consisting of sulfate and phosphate, and its N-terminal amino protected derivatives, wherein the amino protecting group is selected from the group consisting of tosyl, benzyloxycarbonyl, t-butyloxycarbonyl, p-nitrocarbonenzoxy, trityl, formyl and triflouracetyl.

2.  $\overset{SO_3H}{L-Tyr}-L-Thr-Gly-L-Trp-L-Met-L-Asp-L-Phe-NH_2$

3.  $\overset{PO_3H_2}{L-Tyr}-L-Thr-Gly-L-Trp-L-Met-L-Asp-L-Phe-NH_2$

4.  $\overset{PO_3H_2}{L-Tyr}-L-Met-Gly-L-Trp-L-Met-L-Asp-L-Phe-NH_2$

5.  $Boc-L-\overset{SO_3H}{Tyr}-L-Met-Gly-L-Trp-L-Met-L-Asp-L-Phe-NH_2$

6.  $Boc-L-\overset{SO_3H}{Tyr}-L-Thr-Gly-L-Trp-L-Met-L-Asp-L-Phe-NH_2$

7.  $Boc-L-\overset{PO_3H_2}{Tyr}-L-Thr-Gly-L-Trp-L-Met-L-Asp-L-Phe-NH_2$

8.  $Tfa-L-\overset{SO_3H}{Tyr}-L-Thr-Gly-L-Trp-L-Met-L-Asp-L-Phe-NH_2.$

9.  $\overset{SO_3H}{L-Tyr}-L-Nle-Gly-L-Trp-L-Met-L-Asp-L-Phe-NH_2.$

10. $\overset{SO_3H}{L-Tyr}-L-Abu-Gly-L-Trp-L-Met-L-Asp-L-Phe-NH_2.$

11. $\overset{SO_3H}{L-Tyr}-L-Val-Gly-L-Trp-L-Met-L-Asp-L-Phe-NH_2.$

12. $\overset{SO_3H}{L-Tyr}-L-Thr-Gly-L-Trp-L-Nle-L-Asp-L-Phe-NH_2.$

13. $Boc-L-\overset{SO_3H}{Tyr}-L-Nle-Gly-L-Trp-L-Met-L-Asp-L-Phe-NH_2.$

14. $Boc-L-\overset{SO_3H}{Tyr}-L-Thr-Gly-L-Trp-L-Nle-L-Asp-L-Phe-NH_2.$

15. O-sulfate-L-tyrosyl-L-methionyl-glycyl-L-tryptophyl-L-methionyl-L-aspartyl-L-phenylalaninamide.

* * * * *

UNITED STATES PATENT OFFICE
CERTIFICATE OF CORRECTION

Patent No. 3,705,140  Dated December 5, 1972

Inventor(s) Luigi Bernardi et al

It is certified that error appears in the above-identified patent and that said Letters Patent are hereby corrected as shown below:

Title Page, after inventors' names: should read
-- Assignors to Societa' Farmaceutici Italia, Milan, Italy --.
Title page, in ABSTRACT, line 7:
"$SO_3H$
$|$
Tyr-Pho- "  should read:  -- $SO_3H$
$|$
Tyr-Phe-  --.
Title page, in ABSTRACT, line 8:
"$SO_3H$
$|$
Tyr-Nlo- "  should read:  -- $SO_3H$
$|$
Tyr-Nle-  --.
Column 1, lines 15-16:
"$SO_3H$
$|$
Tyr-Pho- "  should read:  -- $SO_3H$
$|$
Tyr-Phe-  --.
Column 1, lines 18-19:
"$SO_3H$
$|$
Tyr-Nlo-, "  should read:  -- $SO_3H$
$|$
Tyr-Nle-  --.

Column 2, line 10: "p--nitrophenylester" should read -- p-nitrophenylester --.
Columns 3-4, Table 1, line 1, under the heading "Compounds":
"$SCH_3$
$|$
Tyr- "  should read:  -- $SO_3H$
$|$
Tyr-  --.

-1-

UNITED STATES PATENT OFFICE
CERTIFICATE OF CORRECTION

Patent No. 3,705,140　　　　　　　　　Dated December 5, 1972

Inventor(s) Luigi Bernardi et al

It is certified that error appears in the above-identified patent and that said Letters Patent are hereby corrected as shown below:

Column 3-4, Table 1, line 3, under the heading "Compounds":
"$\underset{\text{Tyr-}}{\text{SC}_3\text{H}}$ " should read -- $\underset{\text{Tyr-}}{\text{SO}_3\text{H}}$ --.

Column 3-4, Table 1, line 6, under the heading "Compounds":
"$\underset{\text{Tyr-}}{\text{SC}_3\text{H}}$ " should read -- $\underset{\text{Tyr-}}{\text{SO}_3\text{H}}$ --.

Column 3, lines 35-37: "-Phe-NM$_2$" should read -- -Phe-NH$_2$ --.
Column 3, line 46: "carbobenyoxy" should read -- carbobenzoxy --. Column 4, lines 36-38:
"$\overset{\text{Ac}}{\text{H}_2\text{ Thr-NH-NH-Z Cl}}$" should read -- $\overset{\text{Ac}}{+\text{H}_2\text{-Thr-NH-NH-Z}\cdot\text{Cl}^-}$, --.

Column 4, lines 50-55: "$\overset{\text{Ac}}{\text{H}_2\text{-Thr-NH-NH-Z}\cdot\text{Cl}^-}$" should read
-- $\overset{\text{Ac}}{+\text{H}_2\text{-Thr-NH-NH-Z}\cdot\text{Cl}^-}$ --.

Column 7, line 8: " H Gly Trp Met Asp-Phe-NH$_2$Cl" should read
-- +H$_2$-Gly-Trp-Met-Asp-Phe-NH$_2$·Cl$^-$ --.

Column 7, lines 66-68:
"Pyr Glu $\overset{\text{SO}_3\text{H}}{\text{Tyr}}$ Thr Gly Trp Met Asp Phe NH$_2$ " should read

UNITED STATES PATENT OFFICE
CERTIFICATE OF CORRECTION

Patent No. 3,705,140     Dated December 5, 1972

Inventor(s) Luigi Bernardi et al

It is certified that error appears in the above-identified patent and that said Letters Patent are hereby corrected as shown below:

$$\overset{\mathrm{SO_3H}}{|}$$
-- Pyr-Glu-Tyr-Thr-Gly-Trp-Met-Asp-Phe-NH$_2$ --.

Column 10, line 44:
"Boc-Tyr-Trp-Gly-Met-Asp-Phe-NH$_2$"   should read:

-- Boc-Tyr-Trp-Gly-Trp-Met-Asp-Phe-NH$_2$ --.

Column 13, lines 52-54:

$$\overset{\mathrm{SO_3H}}{|}$$
"Boc Tyr-Thr-Gly-Trp-Nle-Asp-Phe-HN"   should read:

$$\overset{\mathrm{SO_3H}}{|}$$
-- Boc-Tyr-Thr-Gly-Trp-Nle-Asp-Phe-NH$_2$ --.

Column 13, lines 55-57:   should read:

$$\overset{\mathrm{SO_3H}}{|}$$
--   $E_{5.8} = 0.53$    Tyr. --.

Column 14, lines 40-42:
"PO$_3$H
 |
 Tyr-Gly-Trp-Met-Asp-Phe-NH"   should read:

-- PO$_3$H$_2$
   |
   Tyr-Gly-Trp-Met-Asp-Phe-NH$_2$ --.

PO-1050
(5/69)

UNITED STATES PATENT OFFICE
CERTIFICATE OF CORRECTION

Patent No. 3,705,140                     Dated December 5, 1972

Inventor(s) Luigi Bernardi et al

It is certified that error appears in the above-identified patent and that said Letters Patent are hereby corrected as shown below:

Column 15, line 34: "carbo-t-butoxy- -Thr-$NHNH_2$" should read -- carbo-t-butoxy-Thr-$NHNH_2$ --.

Column 18, between Example 17 and the claims insert the following paragraph:
-- The optical configuration of the amino acids as described hereinabove and in the claims is the L-isomer except for optically inactive glycine --.

Signed and sealed this 25th day of June 1974.

(SEAL)
Attest:

EDWARD M. FLETCHER, JR.                  C. MARSHALL DANN
Attesting Officer                         Commissioner of Patents